June 16, 1942. S. O. BLANC Re. 22,113
DRAIN CLEANER
Original Filed Aug. 20, 1934
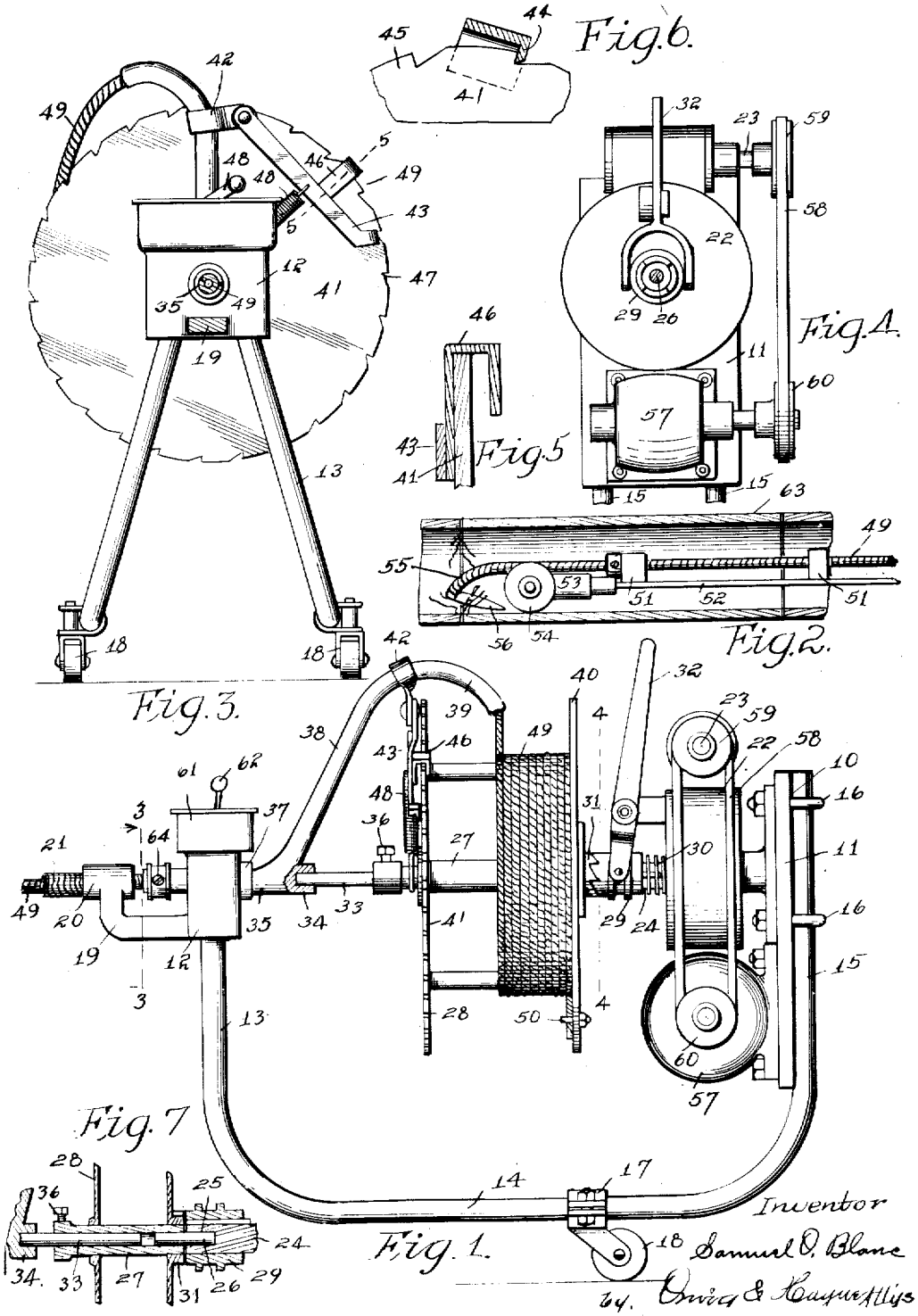
Inventor
Samuel O. Blanc
By Orris & Haywettlys
Att.

Reissued June 16, 1942

Re. 22,113

UNITED STATES PATENT OFFICE 22,113

DRAIN CLEANER

Samuel O. Blanc, Des Moines, Iowa

Original No. 2,111,527, dated March 15, 1938, Serial No. 740,621, August 20, 1934. Application for reissue March 15, 1940, Serial No. 324,226

11 Claims. (Cl. 15—104.30)

This invention relates to that type of devices for cleaning sewer and drain tile and to that type employing a flexible shaft which is usually in the form of a closely wound helix and of tempered steel, which is usually inserted lengthwise into the drain or sewer pipe and rotated, or otherwise agitated, to loosen any material clogging the tile, such as tree roots and dirt.

The object of my invention is to provide a suitable machine or device for supporting the coil of said flexible shaft wherein any unused portions of the shaft may be conveniently supported and wherein any desired amount of the shaft may be moved longitudinally into operative position by simply unwinding the shaft from the supporting reel, and to provide, in connection therewith, means for rotating the flexible shaft about its longitudinal axis and thus to provide means whereby a suitable cutter may be secured to the operating end of the shaft for cutting loose tree and vegetable roots extending into the tile or sewer, and to assist in loosening solid materials lodged therein as the flexible shaft is rotated.

More specifically, it is the object of my invention to provide a portable supporting frame which may be adjusted at different working angles whereby the flexible shaft may be supported primarily in a number of different angles to meet the working conditions, and wherein the flexible shaft may be rotated by power means when the frame is in any one of the adjusted angles.

A further object is to provide in a drain cleaner an improved supporting frame in which is detachably supported a reel and rotatably mounted tubular shaft through which a flexible shaft may be threaded, with power means for rotating the reel and means for either frictionally or positively connecting the tubular shaft with the reel, whereby the said reel and tubular shaft may be rotated in unison or may be rotated at different speeds.

My invention consists in the construction, arrangement and combination of the various parts of the device, whereby the objects contemplated are attained, as hereinafter more fully set forth, pointed out in my claims, and illustrated in the accompanying drawing, in which—

Figure 1 is a side elevation of my improved device, a portion of the flexible guide and sleeve and the forward end of the flexible shaft being broken away.

Figure 2 illustrates the forward end of the flexible shaft, together with the carriage for supporting the same, and the cutter member connected to said shaft, and also the means for feeding the carriage into and out of the drain tile.

Figure 3 is a detail end elevation of my improved device, taken on the sectional line 3—3 of Figure 1.

Figure 4 is a detail sectional view taken on the line 4—4 of Figure 1.

Figure 5 is a detail sectional view taken on the line 5—5 of Figure 3.

Figure 6 is a detail sectional view of the dog for locking the reel and tubular shaft in operative relation, and Figure 7 is a detail sectional view taken on the line 7—7 of Figure 1.

On the drawing I have used the reference numeral 10 to indicate generally the supporting frame. Said frame comprises head blocks 11 and 12, the block 12 being formed preferably of cast metal designed to tie together to corresponding upper ends of leg members 13, which upper ends are cast therein.

Each of the leg members 13 is bent rearwardly at its lower end to form a horizontal portion 14, the free end of which is bent upwardly to form leg members 15. The upper ends of the leg members 15 are secured to the head member 11 by means of suitable U bolts 16. The members 14 are spaced apart a considerable distance as illustrated in Figure 3.

Adjustably supported on each of the members 14 is a bracket 17, each of said brackets being designed to support a caster 18. Said casters provide means whereby the frame may be easily moved from one position to another when the members 14 are supported substantially in a horizontal position.

A forwardly extending bracket member 19 is secured to the forward face of the member 12 to form a handle which may be easily grasped by the operator for conveniently moving said frame. The member 19 is also provided with a hub 20 for supporting one end of a flexible tubular guide member 21.

Carried by the upper end of the inner face of the member 11 is a worm gear casing 22 rotatably supporting a worm shaft 23 and a worm gear driven shaft 24, the shaft 24 being in axial alinement with the center of the tubular guide 21. The forward end of the shaft 24 is provided with a hole 25 for receiving one end of a stub shaft 26. The other end of the shaft 26 is fixed in the hub portion 27 of the reel 28, as clearly illustrated in Figure 7.

The shaft 24 is also provided with a feathered clutch member 29. A spring 30 is provided for yieldably and normally holding the clutch member in engagement with a coacting clutch member 31 fixed to the hub on the reel 28, the teeth of the clutch members being of the ratchet type to permit rotation of the reel in one direction and to prevent rotation in the opposite direction.

A lever 32 is provided for actuating the clutch member 29.

The forward end of the hub 27 is provided with a slidably mounted shaft 33, having its forward end rotatably mounted in a bearing member 34 carried by the tubular shaft 35, said shaft being rotatably mounted in a suitable bearing supported in the block 12.

A set screw 36 is provided for locking the shaft 33 in operative position. By this arrangement means is provided wherein the reel 28 may be easily removed, if so desired, by simply loosening the set screw 36 and pushing the shaft 33 inwardly until its forward end disengages the bearing member 34. The reel may then be moved forwardly a slight distance to pull the reel end of the shaft 26 out of the hole 25, thus allowing the reel to be easily removed if so desired. This is very valuable due to the fact that it is oftentimes desirable to disassemble the apparatus so as to permit the frame member 10 to be more easily placed through basement windows or narrow doorways.

The tubular shaft 35 is provided with a collar 37 for limiting the forward longitudinal movement of said shaft, the shaft 33 serving to limit the tubular shaft against rearward movement.

The rear end of the tubular shaft 35 is provided with a laterally extending portion 38 which terminates in a curved portion 39, the free end of which terminates above the reel 28 and substantially midway between its end members 40 and 41, as clearly illustrated in Figure 1. By this arrangement it will be seen that the reel may be rotated about an axis common to the axis of the tubular shaft 35 so that the said tubular shaft and reel may be rotated in unison, if so desired, or one rotated at a different speed from the other, or the tubular shaft may be held stationary while the reel is being rotated, or vice versa.

Means is provided whereby the reel and arm 38 may be rotated in unison, said means comprising a bracket 42 secured to the curved portion 39 of the member 38. One end of a lever 43 is pivotally connected to said bracket, the other end of said lever being provided with a pawl 44 designed to engage ratchet teeth 45 formed in the periphery of the end member 41, as clearly illustrated in Figures 3 and 6.

The lever 43 is also provided with a friction device 46 substantially in the form of a hook designed to rest on the periphery of the member 41, the width of the face of the hook 46 being such as to ride over the notches 47 in the periphery of the member 41 without making positive contact.

A spring 48 is provided for yieldingly supporting the member 46 in frictional engagement with the periphery of the member 41 or for yieldably holding the member 44 in frictional engagement with the said periphery and the ratchet teeth formed therein.

The hook 46 is of such width as to permit a considerable amount of lateral movement of the free end of the arm 43 so that the pawl 44 may be placed in position on the periphery of the member 41 or placed in a position to disengage said periphery at a point adjacent to the rear face of said member 41, as illustrated in Figure 3. By this arrangement, the arm 38 may be either positively locked to the reel 28 when the pawl 44 is in engagement with the periphery of the member 41, or the said arm may be frictionally driven when the said pawl is disengaged therefrom, for the purpose hereinafter made clear.

Wound on the reel 28 is a flexible shaft 49, one end of which is fixed to the flange 40 by means of a U-bolt 50. The other end of the shaft 49 is threaded through the tubular members 39, 38, 35 and finally through the flexible guide 21. The forward end of the shaft 49 is supported by suitable bearings 51 mounted on a flexible metal tape 52, the forward end of the tape being supported by a carriage 53, having supporting wheels 54. The extreme forward end of the shaft 49 terminates in a curved portion 55, which in turn terminates in a sharpened cutter blade 56.

The carriage 53 and the cutter blade 56 are designed to be inserted longitudinally into the drain pipe to be cleaned. At the same time rotation is imparted to the shaft 49 by rotating the reel 28 and the arm 38. The reel 28 is rotated by the shaft 24, which in turn is rotated by means of a motor 57 carried by the member 11, a belt 58 being provided for imparting motion from the motor to the worm shaft 23 by means of suitable pulleys 59 and 60.

A switch box 61 is mounted on the upper end of the block 12 in which is supported an ordinary switch 62 for controlling the electric motor 57, the said switch being operatively connected in the conductors of the motor through one of the pipes 13.

The practical operation of my device is as follows:

Assuming that flexible shaft 49 has been wound on the reel 28 and that the one end is secured to the end member 40 by the U bolt 50 and that the other end of the flexible shaft has been threaded through the tubular shaft 35, together with the guide 21, and that the carriage 53 is inserted into a drain 63 and that rotation is imparted to the reel 28, then it will readily be seen that the tubular member 35 will be rotated by that portion of the flexible shaft 49 wound on the drum 27, which in turn will rotate the cutter blade 56.

In the event that the cutter blade should engage a root or other obstacle and should not sever it immediately, then the flexible shaft 49 would be twisted as the knife is held stationary, increasing the tension on the knife until it would slip off of the obstruction in case it did not sever. The potential energy thus stored up would be released as soon as the knife had slipped from the obstruction, permitting the same to rotate very rapidly so that the knife would strike the obstacle with a quick blow, thus greatly increasing its ability to sever the root or other obstacle.

The tape 52 provides means for forcing the cutter into the obstructed end of the drain and relieves the shaft 49 from the compression strains.

By forming the curved portion 55 in the shaft 49, the blade 56 may be so positioned as to follow the inner surface of the tile or drain, due to centrifugal force caused by the blade of the knife as it is rotated.

Assuming that the reel is still rotating and that it is desired to feed the shaft 49 longitudinally into the drain, this may be accomplished by simply pulling the shaft forwardly which would cause a portion of it to be unwound from the reel and would cause the member 39 to rotate at a slightly higher rate of speed than the reel 28, the member 39 being permitted to advance due to the construction of the friction hook 46, this forward movement of the shaft taking place as forward pressure is applied to the member 52. Thus, it will be seen that any amount of the flexible shaft may be used as needed without stopping the rotation of the said shaft.

Under actual working conditions it sometimes happens that as the reel is being rotated and the cutting knife being rotated by the flexible shaft, that the cutting knife encounters obstructions which temporarily retard or stop its rotation and thereafter permit the release of the cutter and these different conditions follow quickly in succession. Under such conditions there is at times a tendency for the flexible shaft as it is advanced through the arm 38 to rotate said arm faster or slower than the rotation of the reel and this would permit the flexible shaft to move longitudinally. At times it is desirable to prevent such movement of the arm 38 and for that purpose I have provided the friction brake member 46 to oppose such relative movement of the arm 38, and for additional protection against the movement of the arm 38 toward the left as shown in Figure 3, I have provided the ratchet device 44 and 47.

When it is desired to withdraw the shaft from the drain, then the operator simply grasps the arm 38 and retards its movement while the reel 41 is being rotated.

If the motor is stopped and it is desired to wind some of the shaft 49 on the reel, then the operator grasps the periphery of the member 40 and turns it in a counterclockwise direction, as viewed in Figure 3, at the same time holding the arm 38 against rotation.

On account of the beveled teeth in the clutch members 29 and 31 rotation of the reel is permitted without rotating the shaft 24 of the motor connected therewith.

The outer end of the tubular shaft 35 is provided with a set screw 64 for locking the flexible shaft 49 against longitudinal movement therein when so desired, and when so locked the entire frame 10 may be moved forwardly to cause the flexible shaft to be advanced in the drain. The flexible guide 21 serves to make connection with the entrance of the drain, thereby providing means to prevent kinking of the shaft and torsional strains applied thereto.

The frame member 10 may be supported on the casters 18 with either end of the members 14 resting on the supporting floor, in which case two different inclinations are provided for the member 35, or, if desired, the entire frame may be supported on the members 15, with the shaft 35 extending vertically.

The entire unit may be disassembled by sliding the shaft 33 longitudinally in the hub 27 in the manner before described, so that the reel 28 may be removed, after which the shaft 35 may be removed from its bearing by first removing the collar in which the set screw 64 is mounted.

Thus it will be seen I have provided a device for operating flexible shafts, as used in connection with drain cleaning tools, which is of simple, durable and inexpensive construction.

What is claimed is:

1. In a device of the class described, a supporting frame, a reel for supporting a flexible drive shaft rotatably mounted in said frame, a rotatably mounted tubular shaft in alinement with the axis of said reel and mounted to rotate relative to said reel, the inner end of said tubular shaft being bent outwardly and thence curved inwardly over said reel, a flexible shaft wound on said reel, having one end fixed to the reel and its opposite end threaded through said tubular shaft, and means for rotating said reel, and means for controlling relative movement between said reel and said tubular shaft.

2. In a device of the class described, a supporting frame, a reel for supporting a flexible drive shaft rotatably mounted in said frame, a tubular shaft in alinement with the axis of said reel and mounted to rotate relative to said reel, the inner end of said tubular shaft being bent outwardly and thence curved inwardly over said reel, a flexible shaft wound on said reel, having one end fixed to the reel and its opposite end threaded through said tubular shaft, means for rotating said reel, and means for tiltably supporting said frame whereby the tubular shaft may be supported at various inclined positions.

3. In a device of the class described, a supporting frame, a reel rotatably mounted in said frame, a tubular shaft mounted to rotate relative to said reel and in alinement with the axis of said reel, the inner end of said tubular shaft being bent outwardly, thence inwardly, and terminating at a point over said reel, a flexible shaft wound on said reel, having one end fixed thereto and its opposite end threaded through said tubular shaft, means for operatively connecting said tubular shaft to said reel, means for rotating said reel, and a clutch member for operatively connecting said reel rotating means to said reel, said clutch member being adapted to permit the reel to rotate freely in one direction.

4. In a cleaner for drain pipes, the combination of a frame, a flexible shaft adapted to support a cutter element at one end and to be moved longitudinally into a drain pipe and to be rotated therein, a reel for supporting the unused end of said flexible shaft, means for rotatably mounting said reel in said frame to permit the reel to rotate to impart torsional motion to said shaft, a guide for the flexible shaft supported in position spaced from said reel and substantially in the axis of said rotation of the reel, the flexible shaft being passed from said reel through said guide, and means supported between the reel and guide adapted to rotate with said reel for guiding that portion of the flexible shaft between the reel and guide to prevent kinking and buckling when torsional strain is applied to said flexible shaft.

5. In a device of the class described, a supporting frame, a reel rotatably mounted in said frame, a flexible shaft coiled and carried by said reel, a tubular shaft mounted to rotate relative to said reel and in alinement with its axis of rotation, the inner end of said tubular shaft being bent outwardly and terminating at a point near said coil, the free end of said flexible shaft being extended through said tubular shaft, and means for rotating said reel.

6. In a device of the class described, a supporting frame, a reel rotatably mounted in said frame, a flexible shaft coiled and carried by said reel, a tubular shaft mounted to rotate relative to said reel and in alinement with its axis of rotation, the inner end of said tubular shaft being bent outwardly and terminating at a point near said coil, the free end of said flexible shaft being extended through said tubular shaft, means for operatively connecting said tubular shaft to said reel, means for rotating said reel, and a clutch member for operatively connecting said reel rotating means to said reel, said clutch being adapted to operate to permit the reel to rotate freely in one direction.

7. The combination of a supporting frame, a reel rotatably mounted therein, a flexible shaft carried by said reel having one end operatively connected thereto, and means mounted to rotate relative to said reel about the axis thereof for guiding the free end of said flexible shaft from said reel to a point in alinement with said axis of rotation of said reel and for moving said flexible shaft axially on relative rotation between said guiding means and said reel.

8. In a clear for drain pipes, the combination of a frame, a flexible shaft adapted to support a cutter element at one end and to be moved longitudinally into a drain pipe and to be rotated therein, a reel for supporting the unused end of said flexible shaft, means for rotatably mounting said reel to permit the reel in said frame to rotate to impart torsional motion to said shaft, a tubular shaft mounted to rotate relative to said reel and in alinement with the axis of said rotation of the reel, the inner end of said tubular shaft being bent outwardly and terminating at a point near said reel for guiding the free end of said flexible shaft from said reel through the outer end of said tubular shaft to prevent kinking and buckling of the shaft when torsional strain is applied thereto.

9. In a drain cleaner, the combination of a flexible shaft formed of resilient material which when one end is rotated about its longitudinal axis and the other end held against such rotation will be twisted and torsional strains be set up therein, a reel having one end portion of said flexible shaft fixed thereto against rotation relative to the longitudinal axis of the flexible shaft, and coiled portions of said flexible shaft carried by the reel, means for imparting rotary motion to the reel and from the reel to the flexible shaft about an axis at the central portion of said coils in the direction for twisting the flexible shaft relative to the longitudinal axis of the flexible shaft, and for forcing the coiled portions of the flexible shaft into firm engagement with the reel, to thereby oppose uncoiling of said coiled portions of the flexible shaft relative to the reel, a guide for the flexible shaft spaced apart from the coiled portions of the flexible shaft upon the reel and in line with the axis of the reel and through which the flexible shaft is extended, an anti-kink guide device having said flexible shaft extended through it and being positioned between points adjacent said guide and the coiled portions of the flexible shaft carried by the reel, portions of said anti-kink guide device being in engagement with the flexible shaft at points spaced laterally from the axis of the reel and shaped to prevent kinking movement of the flexible shaft between the guide and the reel, said anti-kink guide device being rotatably supported at a point in line with the axis of the reel for rotation by the reel and flexible shaft at the same speed as that of the reel and said anti-kink device being also capable of independent rotation relative to the reel, said flexible shaft being adapted to carry a cutting blade at its free end portion, said elements being so arranged and combined that when said cutting blade is stopped and held against rotation and the rotation of the reel is continued thereafter, the flexible shaft will be twisted and torsional strains set up therein, and whereby when the blade becomes released the torsional strains stored in the flexible shaft will rapidly and forcefully rotate the blade.

10. A machine for cleaning sewers and the like, comprising an elongated flexible coiled wire spring element capable of being projected into circuitous sewer pipes and of being wound to a high tension and of storing mechanical energy therein of sufficient magnitude to drive a cutter to be mounted on the outer end thereof through roots or other obstructions found in sewers, a guide through which said spring element is free to pass axially and in which it may twist or rotate, and a reel mounted for rotation on an axis in alignment with the axis of said guide, said spring element having its inner end fixed to said reel, said reel being adapted, by rotation on said axis, to permit of paying out and reeling in desired lengths of said spring element as may be required in use, and serving to hold in coiled relationship about said axis, such portions of said spring element as may be unused at any particular time, means between said guide and reel for at all times maintaining that portion of the spring element which is disposed between the guide and reel against kinking or buckling when under tension and in a crank-like formation, and at all times permitting such portion to pass axially therethrough and to twist or rotate therein, said reel further serving, by rotation on said axis, to impart bodily rotation to said spring element when its outer end is free to rotate, and a twist thereto to store tension therein when its outer end is held against rotation, and said spring element being free to twist and store such energy throughout its entire length including such portion thereof as may be held in coiled relationship by said reel, and means for imparting rotation to said reel in a direction to wind tension in said spring element and to maintain the unused portion thereof in coiled relationship.

11. A machine for cleaning sewers and the like, comprising an elongated flexible coiled wire spring element capable of being projected into circuitous sewer pipes and of being wound to a high tension and of storing mechanical energy therein of sufficient magnitude to drive a cutter to be mounted on the outer end thereof through roots or other obstructions found in sewers, a guide through which said spring element is free to pass axially and in which it may twist or rotate, and a reel mounted for rotation on an axis in alignment with the axis of said guide, said spring element having its inner end fixed to said reel, said reel being adapted, by rotation on said axis, to permit of paying out and reeling in desired lengths of said spring element as may be required in use, and serving to hold in coiled relationship about said axis, such portions of said spring element as may be unused at any particular time, means between said guide and reel for at all times maintaining that portion of the spring element which is disposed between the guide and reel against kinking or buckling when under tension and in a crank-like formation, and at all times permitting such portion to pass axially therethrough and to twist or rotate therein, said reel further serving, by rotation on said axis, to impart bodily rotation to said spring element when its outer end is free to rotate, and a twist thereto to store tension therein when its outer end is held against rotation, and said spring element being free to twist and store such energy throughout its entire length including such portion thereof as may be held in coiled relationship by said reel, and means for imparting rotation to said reel in a direction to wind tension in said spring element and to maintain the unused portion thereof in coiled relationship, and a cutter mounted on the outer end of said spring element having a root-cutting blade constructed to hold the outer end of said spring element against rotation when roots or similar obstructions are encountered in a sewer and to be released from such obstruction under conditions of high tension stored in said spring element by a manipulation of said spring element.

SAMUEL O. BLANC.